United States Patent
Onoda et al.

(10) Patent No.: US 9,910,205 B2
(45) Date of Patent: Mar. 6, 2018

(54) LIGHT-EMITTING DEVICE AND DISPLAY DEVICE

(71) Applicant: Japan Display Inc., Minato-ku (JP)

(72) Inventors: Ken Onoda, Tokyo (JP); Shinichi Komura, Tokyo (JP); Youichi Asakawa, Tokyo (JP); Toshihiko Fukuma, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/363,055

(22) Filed: Nov. 29, 2016

(65) Prior Publication Data

US 2017/0153376 A1 Jun. 1, 2017

(30) Foreign Application Priority Data

Nov. 30, 2015 (JP) .................................. 2015-233176

(51) Int. Cl.
*F21V 8/00* (2006.01)
*G02F 1/1335* (2006.01)

(52) U.S. Cl.
CPC .......... *G02B 6/0031* (2013.01); *G02B 6/003* (2013.01); *G02B 6/0023* (2013.01); *G02B 6/0038* (2013.01); *G02B 6/0068* (2013.01); *G02F 1/13362* (2013.01); *G02F 1/133504* (2013.01); *G02F 1/133512* (2013.01); *G02F 1/133514* (2013.01); *G02F 1/133528* (2013.01); *G02F 2001/133562* (2013.01)

(58) Field of Classification Search
CPC .... G02B 6/0031; G02B 6/0038; G02B 6/003; G02B 6/0068; G02B 6/0023; G02F 1/13362; G02F 1/133528; G02F 1/133512; G02F 1/133514; G02F 2001/133562; G02F 1/133504
See application file for complete search history.

(56) References Cited

U.S. PATENT DOCUMENTS

| | | | |
|---|---|---|---|
| 6,273,571 B1* | 8/2001 | Sharp | G02B 5/3083 348/742 |
| 2013/0155723 A1* | 6/2013 | Coleman | G02B 6/0018 362/621 |
| 2016/0123811 A1* | 5/2016 | Hegyi | G01J 3/0256 348/33 |
| 2017/0017324 A1* | 1/2017 | O'Keeffe | G06F 1/3262 |
| 2017/0160458 A1* | 6/2017 | Asakawa | G02B 6/0025 |

FOREIGN PATENT DOCUMENTS

JP 2014-67531 4/2014

* cited by examiner

*Primary Examiner* — Tracie Y Green
(74) *Attorney, Agent, or Firm* — Oblon, McClelland, Maier & Neustadt, L.L.P.

(57) ABSTRACT

In one embodiment, a light-emitting device includes a light source unit which emits polarized light in a first direction, a bending portion which is irradiated with the polarized light in the first direction and bends the light in a second direction, and a lightguide member which is irradiated with the polarized light caused to bend in the bending portion. The lightguide member comprises an exit surface, bends the polarized light in a third direction, and emits the light through the exit surface. The light source unit includes a first source which emits first light, and a second source which emits second light. The bending portion includes a first incident portion which the first light enters, and a second incident portion which the second light enters.

20 Claims, 8 Drawing Sheets

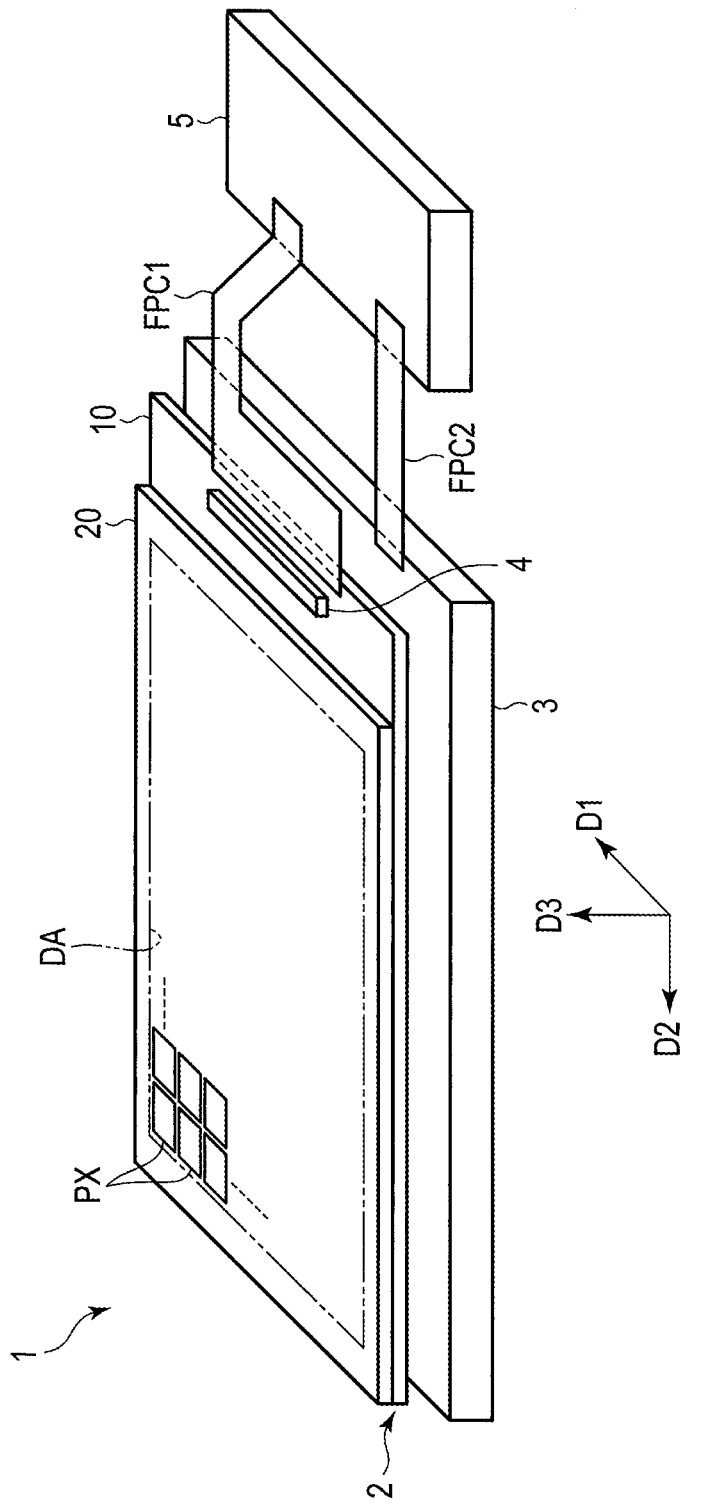
F I G. 1

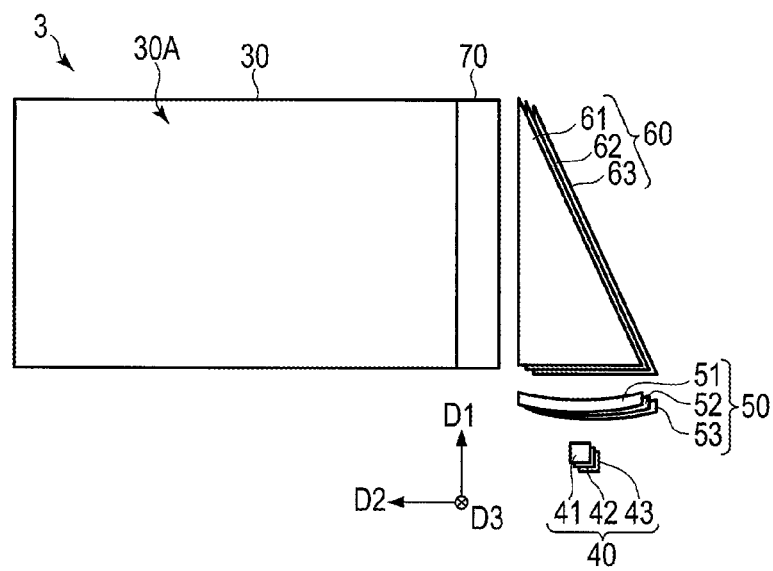
F I G. 3
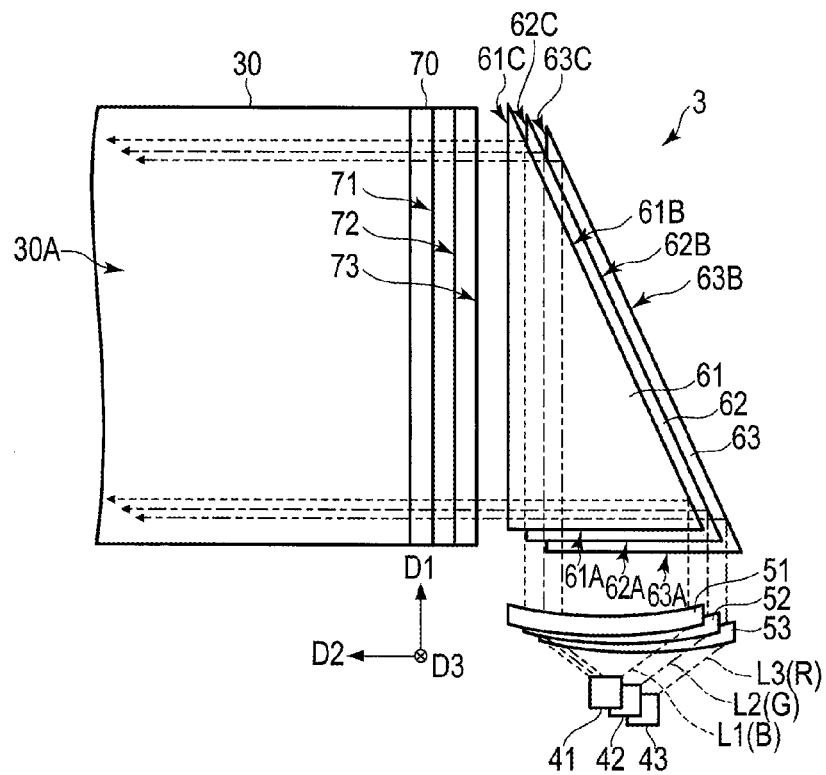
F I G. 4

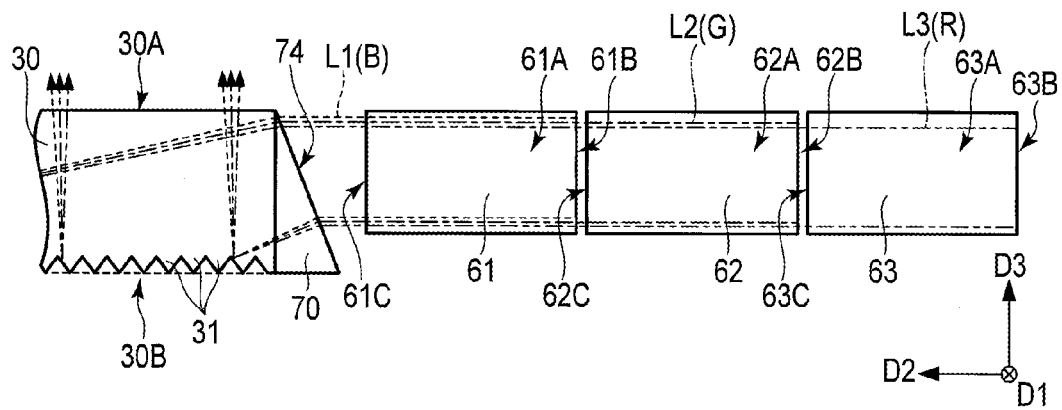
F I G. 7
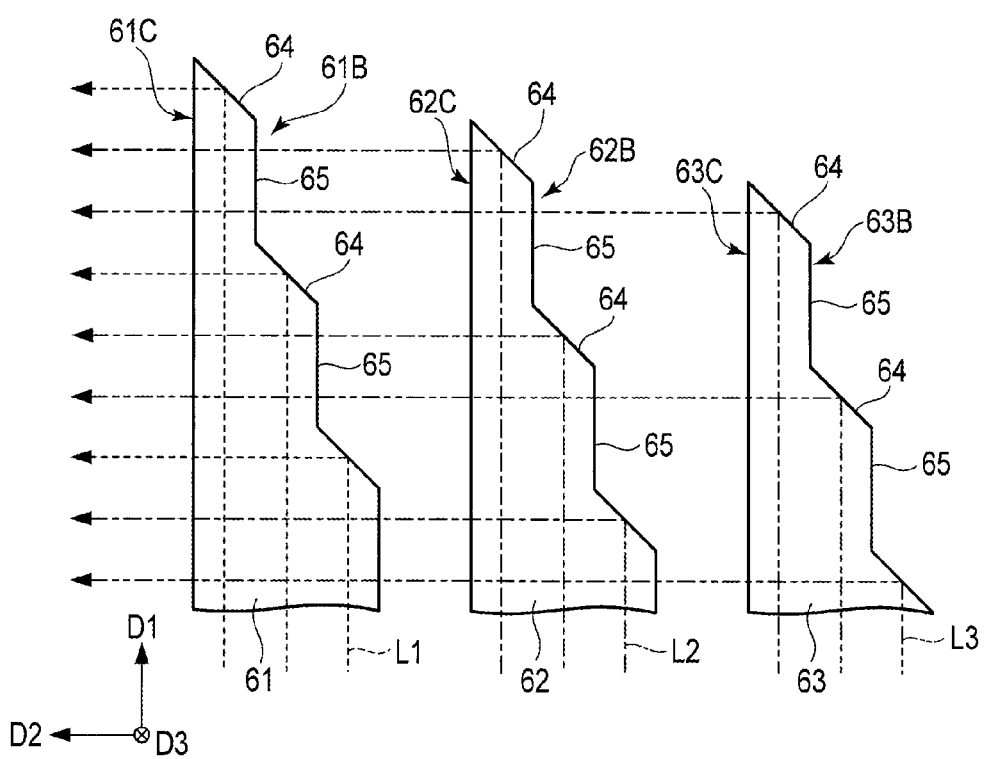
F I G. 8

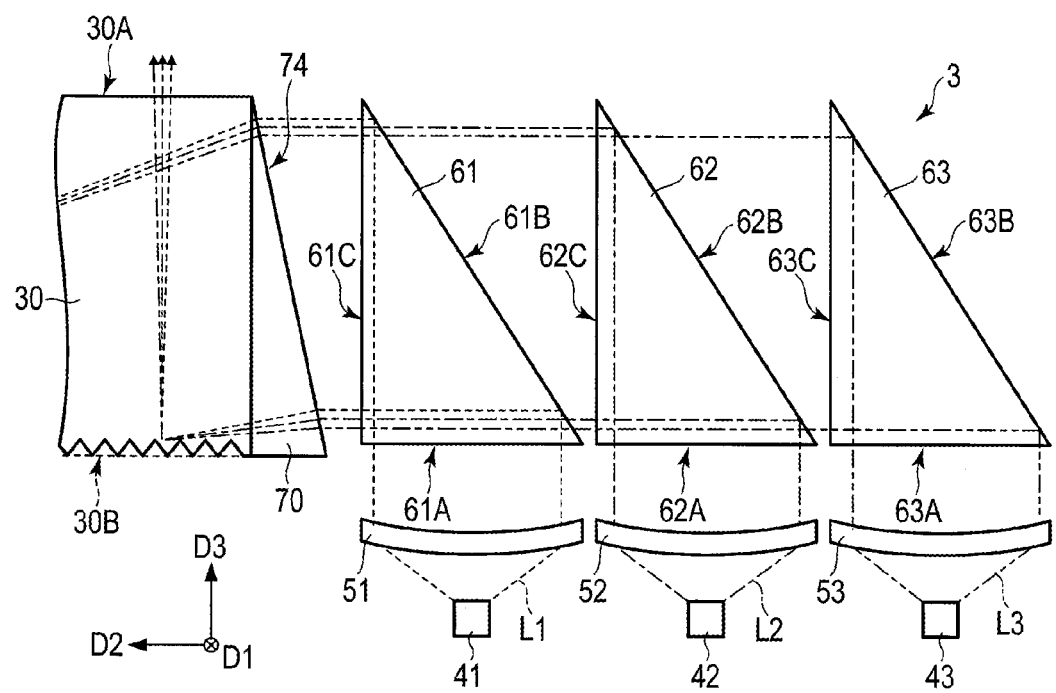
F I G. 12

LIGHT-EMITTING DEVICE AND DISPLAY DEVICE

CROSS-REFERENCE TO RELATED APPLICATIONS

This application is based upon and claims the benefit of priority from Japanese Patent Application No. 2015-233176, filed Nov. 30, 2015, the entire contents of which are incorporated herein by reference.

FIELD

Embodiments described herein relate generally to a light-emitting device and a display device.

BACKGROUND

As one of the conventional backlights of display devices such as liquid crystal display devices, the following device is known. The device comprises a light source which emits polarized light such as laser light, and a lightguide plate which irradiates a display panel with the laser light emitted from the light source.

To obtain, for example, white light with the backlight using polarized light, there is a need to prepare light sources which emit red light, green light and blue light and mix the light emitted from the light sources. The backlight which obtains light in a specific color by mixing polarized light in different colors has various problems.

For example, when polarized light are mixed such that the optical axes are aligned before the light reach the lightguide plate, a space is required to provide an optical system for aligning the light axes. Thus, it is difficult to reduce the size of backlight.

When the polarized light from each light source directly enters the lightguide plate, and the light are mixed in the lightguide plate, the lightguide plate is difficult to equalize surface emission because, for example, the spread angle of polarized light is less.

BRIEF DESCRIPTION OF THE DRAWINGS

FIG. 1 is a plan view schematically showing the structure of a liquid crystal display device according to a first embodiment.

FIG. 3 is a plan view schematically showing the structure of the backlight.

FIG. 4 is a plan view in which a part of the backlight shown in FIG. 3 is enlarged.

FIG. 7 is a side view of a part of a lens portion, a bending portion, a refractive portion and a lightguide member shown in FIG. 6.

FIG. 8 is an enlarged view of a part of the bending portion according to the second embodiment.

FIG. 12 shows a modification example in which the direction of light emitted from each light source is changed.

DETAILED DESCRIPTION

Figure 2:
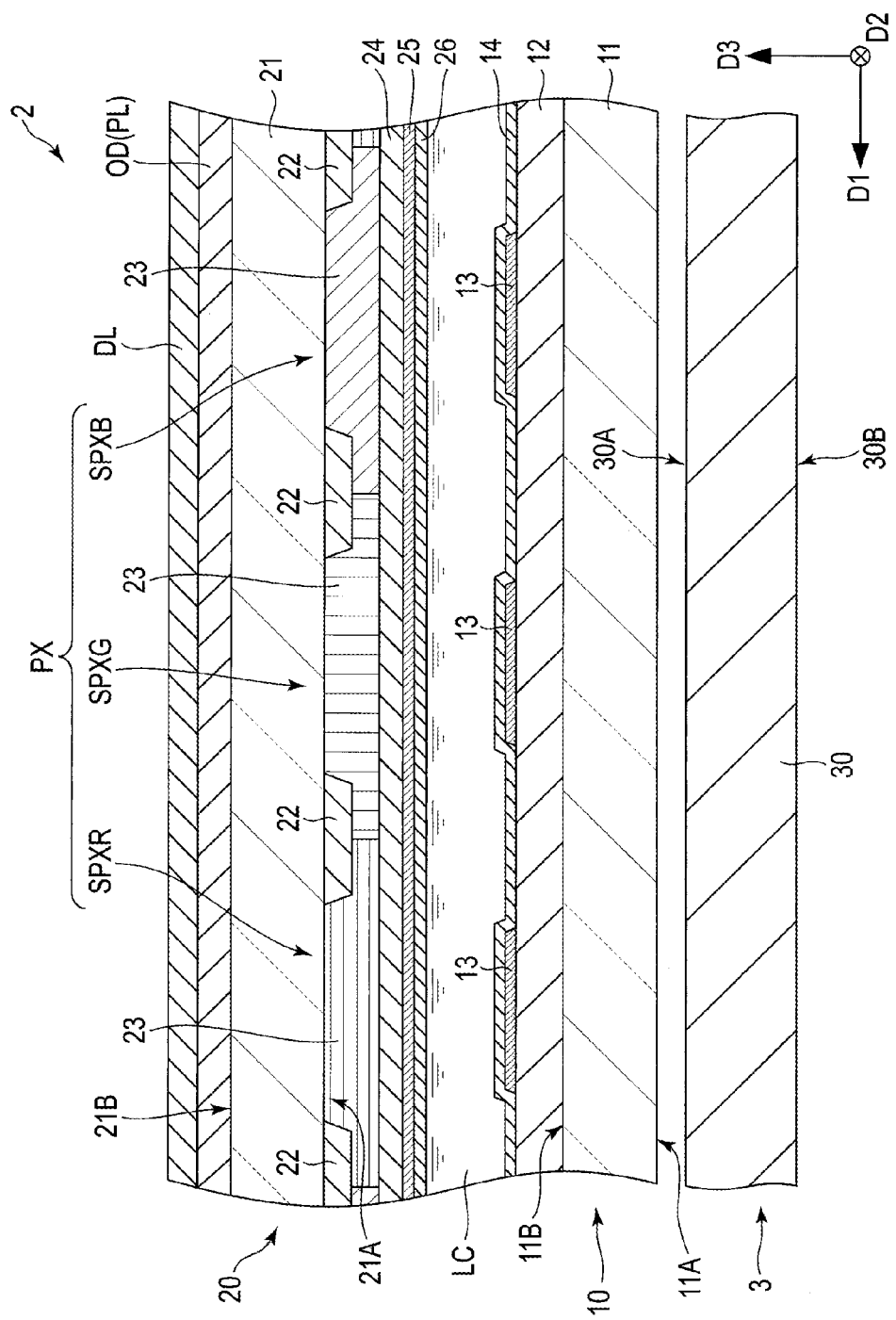
FIG. 2 shows an example of the cross-sectional surfaces of a display panel and a backlight in the liquid crystal display device.

In general, according to one embodiment, a light-emitting device comprises a light source unit which emits polarized light in a first direction, a bending portion which is irradiated with the polarized light in the first direction and bends the polarized light such that the polarized light goes in a second direction intersecting with the first direction, and a light-guide member which is irradiated with the polarized light caused to bend in the bending portion. The lightguide member comprises an exit surface, bends the polarized light such that the polarized light goes in a third direction, and emits the light through the exit surface. The light source unit includes a first light source which emits first light in a first color, and a second light source which emits second light in a second color. The bending portion includes a first incident portion which the first light enters, and a second incident portion which the second light enters.

According to one embodiment, a display device comprises a first substrate, a second substrate, a liquid crystal layer provided between the first substrate and the second substrate, and the above light-emitting device.

Various embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, detailed description thereof being omitted unless necessary.

In each embodiment, as an example of display devices, a transmissive type liquid crystal display device comprising a backlight is disclosed. However, each embodiment does not prevent application of individual technical ideas disclosed in the embodiment to other types of display devices. Other types of display devices include, for example, a liquid crystal display device which has a reflective function reflecting outside light to use it for display in addition to a transmissive function, and a display device comprising a mechanical display panel in which a microelectromechanical systems (MEMS) shutter functions as an optical element. The backlight may be provided as a light-emitting device separately from the liquid crystal display device.

First Embodiment

FIG. 1 is a plan view schematically showing the structure of a liquid crystal display device 1 according to a first embodiment. The liquid crystal display device 1 may be used for various devices such as a smartphone, a tablet, a mobile phone, a personal computer, a television receiver, an in-vehicle device, a game console or a wearable device.

The liquid crystal display device 1 comprises a display panel 2, a backlight 3 as an example of a light-emitting device, a drive IC chip 4 which drives the display panel 2, a control module 5 which controls the operations of the display panel 2 and the backlight 3, and flexible circuit boards FPC1 and FPC2 which transmit a control signal to the display panel 2 and the backlight 3.

In the present embodiment, a first direction D1, a second direction D2 and a third direction D3 are defined as shown in FIG. 1. The first direction D1 is parallel to, for example, the short sides of the display panel 2. The second direction D2 is parallel to, for example, the long sides of the display panel 2. The third direction D3 intersects with the first and second directions D1 and D2. In the example shown in FIG. 1, the first to third directions D1 to D3 perpendicularly intersect with each other. However, the first to third directions D1 to D3 may intersect with each other at other angles. The backlight 3 and the display panel 2 are stacked in the third direction D3.

The display panel 2 comprises a first substrate 10, a second substrate 20 facing the first substrate 10, and a liquid crystal layer (the liquid crystal layer LC described later) provided between the first substrate 10 and the second substrate 20. The display panel 2 comprises a display area DA which displays an image. The display panel 2 comprises, for example, a plurality of pixels PX arranged in matrix in the first and second directions D1 and D2 in the display area DA.

The backlight 3 faces the first substrate 10. The drive IC chip 4 is mounted on, for example, the first substrate 10. However, the drive IC chip 4 may be mounted on the control module 5. Flexible circuit board FPC1 connects the first substrate 10 and the control module 5. Flexible circuit board FPC2 connects the backlight 3 and the control module 5.

FIG. 2 shows an example of the cross-sectional surfaces of the display panel 2 and the backlight 3. FIG. 2 schematically shows the structure of one pixel PX. In FIG. 2, various signal lines and switching elements formed on the first substrate 10 are omitted.

The pixel PX includes a plurality of subpixels which display different colors. In the example of FIG. 2, the pixel PX comprises a subpixel SPXR for displaying red, a subpixel SPXG for displaying green, and a subpixel SPXB for displaying blue. However, the pixel PX may include subpixels for displaying other colors. For example, the pixel PX may comprise a subpixel for displaying white in addition to subpixels SPXR, SPXG and SPXB. The pixel PX may include a plurality of subpixels for displaying the same color.

The first substrate 10 comprises a phototransmissive first insulating substrate 11 such as a glass substrate, an insulating layer 12, a pixel electrode 13, and a first alignment film 14. The first insulating substrate 11 comprises a first main surface 11A facing the backlight 3, and a second main surface 11B on a side opposite to the first main surface 11A.

The insulating layer 12 is formed on the second main surface 11B of the first insulating substrate 11. In FIG. 2, the insulating layer 12 has a single layer. However, the actual insulating layer 12 includes a plurality of layers for a thin-film transistor and various lines. The pixel electrode 13 is formed on a surface of the insulating layer 12 on the second substrate 20 side. The pixel electrode 13 is provided for each subpixel. The first alignment film 14 covers the insulating layer 12 and the pixel electrode 13.

The second substrate 20 comprises a phototransmissive second insulating substrate 21 such as a glass substrate, a light-shielding layer (black matrix) 22, a color filter 23, a planarization layer 24, a common electrode 25, and a second alignment film 26. The second insulating substrate 21 comprises a first main surface 21A facing the first substrate 10, and a second main surface 21B on a side opposite to the first main surface 21A.

The light-shielding layer 22 is provided in the boundary of each subpixel on the first main surface 21A of the second insulating substrate 21, and forms the aperture area of the subpixel. The color filter 23 is provided in the aperture area of each subpixel formed by the light-shielding layer 22. The color of the color filter 23 corresponds to an associated subpixel. The planarization layer 24 covers the color filter 23. The common electrode 25 is formed on a surface of the planarization layer 24 on the first substrate 10 side, and extends over, for example, a plurality of subpixels. The second alignment film 26 covers the common electrode 25. The above liquid crystal layer LC is encapsulated between the first alignment film 14 and the second alignment film 26.

An optical element OD is provided on the second main surface 21B of the second insulating substrate 21. The optical element OD includes, for example, a polarizer PL. In the present embodiment, no polarizer is provided between the backlight 3 and the first substrate 10. If no polarizer is provided in this portion, unintended external light may be reflected in the liquid crystal display device 1 and emitted to outside. Thus, the display quality may be degraded. In this respect, a polarizer may be provided between the backlight 3 and the first substrate 10.

A scattering layer DL is formed on the optical element OD. The scattering layer DL includes scattering particles. By providing the scattering layer DL, it is possible to reduce non-uniformity in in-plane luminance. In particular, when the light emitted from the backlight 3 is collimated light having high parallelism, the in-plane luminance is easily made non-uniform. Use of the scattering layer DL can avoid such a problem. The polarized nature of light polarized in the scattering layer DL may be degraded. However, there is no problem after the light passes through the polarizer PL. The scattering particles are not especially limited as long as they can scatter light. The scattering particles may be either organic particles or inorganic particles. The scattering particles are preferably inorganic particles. As the inorganic particles, inorganic oxide particles are desirable such as silica or alumina.

The backlight 3 comprises a lightguide member 30. The lightguide member 30 comprises an exit surface 30A facing the first main surface 11A of the first insulating substrate 11, and a reflective surface 30B on a side opposite to the exit surface 30A. As explained later in detail, the exit surface 30A emits polarized light to the display panel 2.

When no voltage is applied between a pixel electrode 13 and the common electrode 25, the liquid crystal molecules of the liquid crystal layer LC are in an initial alignment state. In this case, the light emitted from the exit surface 30A passes through the liquid crystal layer LC substantially without changing the polarized state, and is absorbed by the polarizer PL. When voltage is applied between a pixel electrode 13 and the common electrode 25, the alignment state of the liquid crystal modules of the liquid crystal layer LC is changed from the initial alignment state by the electric field generated between the electrodes. In this case, the polarized state of light emitted from the exit surface 30A is changed by the liquid crystal layer LC. The light partially passes through the polarizer PL. Based on this principle of operation, it is possible to display a color image in the display area DA by selectively applying voltage to the pixel electrodes 13 of subpixels.

Now, this specification explains the backlight 3.

FIG. 3 is a plan view schematically showing the structure of the backlight 3. The backlight 3 comprises the lightguide member 30, a light source unit 40, a lens portion 50, a bending portion 60 and a refractive member 70. The positions of the lightguide member 30, the light source unit 40, the lens portion 50, the bending portion 60 and the refractive member 70 are secured by, for example, frames for retaining the display panel 2 and the backlight 3. In addition to these elements, a lens for increasing the width of a light path, and a mirror for diffracting light may be provided between the light source unit 40 and the bending portion 60.

The lightguide member 30 has the shape of a plate, and is formed of, for example, a phototransmissive resin material. The refractive member 70 is directly in contact with an end surface of the lightguide member 30 in the first direction D1. For example, the refractive member 70 is formed of a material having a refractive index equal to that of the lightguide member 30. Thus, no light refraction occurs at the interface between the lightguide member 30 and the refractive member 70.

The light source unit 40 includes a first light source 41, a second light source 42 and a third light source 43. The third light source 43, the second light source 42 and the first light source 41 are stacked in this order in the third direction D3. In the present embodiment, the first to third light sources 41 to 43 are point light sources. However, for example, the first to third light sources 41 to 43 may be line light sources which are long in the second direction D2.

The lens portion 50 includes a first lens 51, a second lens 52 and a third lens 53. The third lens 53, the second lens 52 and the first lens 51 are stacked in this order in the third direction D3. The first to third lenses 51 to 53 may be formed of, for example, a phototransmissive resin material or glass material.

The bending portion 60 causes the path of light emitted from the light source unit 40 to bend such that the light goes to the refractive member 70. The bending portion 60 includes a first bending member 61, a second bending member 62 and a third bending member 63. The third bending member 63, the second bending member 62 and the first bending member 61 are stacked in this order in the third direction D3. The first to third bending members 61 to 63 may be formed of, for example, a phototransmissive resin material or glass material.

Figure 5:
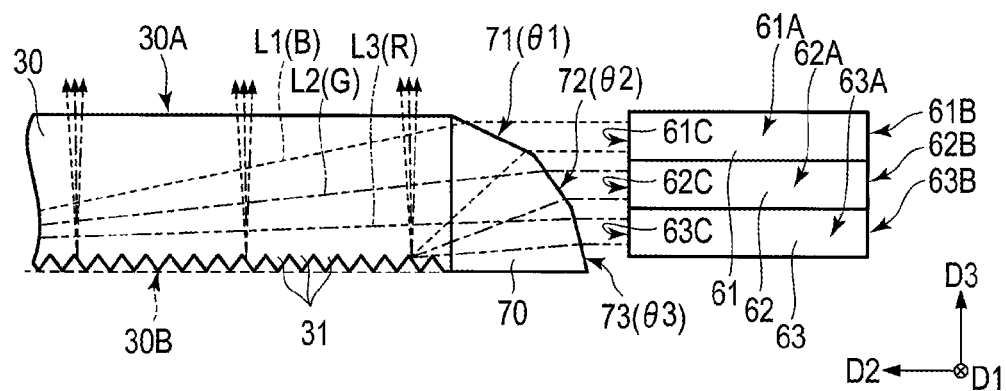
FIG. 5 is a side view of a part of a lens portion, a bending portion, a refractive member and a lightguide member shown in FIG. 4.

FIG. 4 is a plan view in which a part of the backlight 3 shown in FIG. 3 is enlarged. FIG. 5 is a side view of the bending portion 60, the refractive member 70 and the lightguide member 30 shown in FIG. 4. In FIG. 4, for illustrative purposes, the first to third light sources 41 to 43, the first to third lenses 51 to 53 and the first to third bending members 61 to 63 are out of alignment in the first and second directions D1 and D2. However, in the present embodiment, the first to third light sources 41 to 43, the first to third lenses 51 to 53 and the first to third bending members 61 to 63 have, for example, the same shape, and are stacked in the third direction D3 such that the end portions are aligned. The first to third light sources 41 to 43, the first to third lenses 51 to 53 and the first to third bending members 61 to 63 may have different shapes, or may have the same shape and be out of alignment in the first or second direction D1 or D2.

As shown in FIG. 4 and FIG. 5, each of the first to third bending members 61 to 63 has the shape of a flat triangular prism. Specifically, the first bending member 61 comprises a first incident portion 61A, a first reflective portion 61B and a first exit portion 61C. The second bending member 62 comprises a second incident portion 62A, a second reflective portion 62B and a second exit portion 62C. The third bending member 63 comprises a third incident portion 63A, a third reflective portion 63B and a third exit portion 63C. The first to third incident portions 61A to 63A are equivalent to the faces of the first to third bending members 61 to 63 in the second direction D2. The first to third reflective portions 61B to 63B are equivalent to the faces of the first to third bending members 61 to 63 inclined with respect to the first and second directions D1 and D2. The first to third exit portions 61C to 63C are equivalent to the faces of the first to third bending members 61 to 63 in the first direction D1. All of the first to third incident portions 61A to 63A, the first to third reflective portions 61B to 63B and the first to third exit portions 61C to 63C are, for example, flat surfaces parallel to the third direction D3.

As shown in FIG. 5, the first to third bending members 61 to 63 are stacked such that the first to third incident portions 61A to 63A, the first to third reflective portions 61B to 63B and the first to third exit portions 61C to 63C are aligned in the third direction D3. In the example of FIG. 5, the first to third bending members 61 to 63 are stacked without any intervening space. However, a space may be formed between the first bending member 61 and the second bending member 62 and between the second bending member 62 and the third bending member 63.

The first light source 41 emits first light L1 in the first direction D1. The second light source 42 emits second light L2 in the first direction D1. The third light source 43 emits third light L3 in the first direction D1. The first to third light L1 to L3 diffuse on the basis of the first direction D1 such that they spread in a direction intersecting with the first direction D1. The first to third light L1 to L3 are examples of the above polarized light, and have a specific polarizing axis. For the first to third light sources 41 to 43, for example, semiconductor lasers which emit polarized laser light may be used. For the first to third light sources 41 to 43, light sources which include a light-emitting element and a polarizing element may be used. The light emitted from the first to third light sources is preferably collimated light having a high parallelism.

For example, the first light L1 is blue (B) laser light. The second light L2 is green (G) laser light. The third light L3 is red (R) laser light. However, each color of the first to third light L1 to L3 is not limited to this example.

The first lens 51 is provided between the first light source 41 and the first incident portion 61A. The second lens 52 is provided between the second light source 42 and the second incidence portion 62A. The third lens 53 is provided between the third light source 43 and the third incident portion 63A. The first lens 51 converts the first light L1 emitted from the first light source 41 into light parallel to the first direction D1, and irradiates the first incident portion 61A with the light. The second lens 52 converts the second light L2 emitted from the second light source 42 into light parallel to the first direction D1, and irradiates the second incident portion 62A with the light. The third lens 53 converts the third light L3 emitted from the third light source 43 into light parallel to the first direction D1, and irradiates the third incident portion 63A with the light.

The first light L1 which entered the first bending member 61 through the first incident portion 61A is reflected on the first reflective portion 61B, and bends in the second direction D2. The first light L1 is emitted from the first exit portion 61C. The second light L2 which entered the second bending member 62 through the second incident portion 62A is reflected on the second reflective portion 62B, and bends in the second direction D2. The second light L2 is emitted from the second exit portion 62C. The third light L3 which entered the third bending member 63 through the third incident portion 63A is reflected on the third reflective portion 63B, and bends in the second direction D2. The third light L3 is emitted from the third exit portion 63C.

The first to third exit portions 61C to 63C are, for example, flat surfaces perpendicularly intersecting with the second direction D2. Thus, the first to third light L1 to L3 are emitted from the first to third exit portions 61C to 63C, respectively, without refraction.

As shown in FIG. 5, the lightguide member 30 comprises the exit surface 30A and the reflective surface 30B (bottom surface). The reflective surface 30B comprises a plurality of prisms 31 which reflect the light entering the lightguide member 30 through the side surface of the lightguide member 30 such that the light mainly goes in the third direction D3. For example, the prisms 31 are triangular in the cross-sectional surfaces, extend in the first direction D1, and are arranged in the second direction D2.

As shown in FIG. 4 and FIG. 5, the refractive member 70 refracts the path of light emitted from the bending portion 60. The refractive member 70 comprises a first surface 71, a second surface 72 and a third surface 73. In the example of FIG. 5, the first to third surfaces 71 to 73 are flat surfaces which are long in the first direction D1. However, the first to third surfaces 71 to 73 may be curved. The first to third surfaces 71 to 73 are inclined at a first angle $\theta1$, a second angle $\theta2$ and a third angle $\theta3$, respectively, with respect to the reflective surface 30B (or the exit surface 30A) of the lightguide member 30. The first to third angles $\theta1$ to $\theta3$ are acute angles different from each other. Specifically, the second angle $\theta2$ is greater than the first angle $\theta1$. The third angle $\theta3$ is greater than the second angle $\theta2$ ($\theta1<\theta2<\theta3$).

The first light L1 emitted from the first exit portion 61C of the first bending member 61 is refracted on the first surface 71 of the refractive member 70, and enters the lightguide member 30. The second light L2 emitted from the second exit portion 62C of the second bending member 62 is refracted on the second surface 72 of the refractive member 70, and enters the lightguide member 30. The third light L3 emitted from the third exit portion 63C of the third bending member 63 is refracted on the third surface 73 of the refractive member 70, and enters the lightguide member 30.

The reflective surface 30B of the lightguide member 30 is irradiated with the first to third light L1 to L3 refracted on the first to third surfaces 71 to 73 of the refractive member 70. The first to third angles $\theta1$ to $\theta3$ may be determined such that, for example, the entire reflective surface 30B is irradiated with the first to third light L1 to L3. The first to third light L1 to L3 emitted to the reflective surface 30B are reflected on the prisms 31 such that they go in the third direction D3. Subsequently, the first to third light L1 and L3 are emitted from the exit surface 30A to the display panel 2.

The color of light emitted from the exit surface 30A is a mixture of the first to third light L1 to L3. When the first to third light L1 to L3 are blue, green and red, respectively, as described above, the light emitted from the exit surface 30A can be white. Apart from this example, when each color of the first to third light L1 to L3 is changed, an arbitrary color can be obtained.

The present embodiment has the structures explained above. Thus, it is possible to mix the first to third light L1 to L3 emitted from the first to third light sources 41 to 43 in the lightguide member 30. Further, the light emitted from the exit surface 30A of the lightguide member 30 is polarized light in the third direction D3. Thus, there is no need to provide an optical element such as a prism sheet between the lightguide member 30 and the first substrate 10. In this manner, the liquid crystal display device 1 can be thin.

To mix the light emitted from the light sources in different colors, for example, the light may be mixed outside the lightguide member such that the axes of light are aligned. Subsequently, the obtained light may enter the lightguide member. However, when this structure is employed, there is a need to provide an optical system to align the axes of light emitted from the light sources outside the lightguide member. In the present embodiment, such an optical system is unnecessary. In this way, the size of the backlight 3 can be reduced.

As a different structure, for example, each light source may be provided so as to be adjacent to a side surface of the lightguide member. The light emitted from each light source may directly enter the lightguide member, and thus, the light may be mixed inside the lightguide member. However, when this structure is employed, the light must be reflected many times inside the lightguide member such that the light is uniformly mixed. Thus, the degree of polarization of light polarized inside the lightguide member is decreased. The luminous efficiency is reduced because of the absorption of light by the lightguide member. In the present embodiment, the reflection of light in the lightguide member can be minimized. In this way, the luminous efficiency can be enhanced.

The present embodiment having the above structures is desirable in various aspects in comparison with any other possible structures.

With regard to the colors of the first to third light L1 to L3 emitted from the first to third light sources 41 to 43, the best combination may be employed based on the absorbency index and refractive index in accordance with the wavelength of light in the refractive member 70 and the lightguide member 30, and the output of the light sources.

In general, the shorter the wavelength is, the greater the absorbency index of light by the refractive member 70 and the lightguide member 30 is. The wavelengths of red light, green light and blue light have the following relationship: blue light<green light<red light. The absorbency indexes of light are shown as follows: blue light>green light>red light. In the shape of the refractive member 70 shown in FIG. 5, the lengths of paths of the first to third light L1 to L3 inside the refractive member 70 are shown as follows: L1<L2<L3. In consideration of absorption in the refractive member 70, as described above, the first, second and third light L1, L2 and L3 are preferably blue, green and red, respectively. When the light sources have different output, the third light source 43 may have the greatest output. The second light source 42 may have the second greatest output. The first light source 41 may have the least output.

In general, the shorter the wavelength is, the greater the refractive index is. The refractive indexes of light have the following relationship: blue light>green light>red light. The angles at which the first to third light L1 to L3 should be refracted on the first to third surfaces 71 to 73 of the refractive member 70 have the following relationship: L1>L2>L3. In consideration of refractive index, the first, second and third light L1, L2 and L3 are preferably blue, green and red, respectively. In this way, the first and second angles $\theta1$ and $\theta2$ of the first and second surfaces 71 and 72 of the refractive member 70 can approximate perpendicularity. When the first and second angles $\theta1$ and $\theta2$ approximate perpendicularity, the width of the refractive member 70 in the second direction D2 can be decreased.

Apart from the above explanation, various preferred effects can be obtained from the present embodiment.

Second Embodiment

Now, this specification explains a second embodiment. The present embodiment is different from the first embodiment mainly in terms of the structures of a light source unit 40, a lens portion 50 and a bending portion 60. A display panel 2 and structural elements which are not particularly discussed with regard to a backlight 3 are the same as those of the first embodiment. Structural elements identical or similar to those of the first embodiment are denoted by the same reference numbers, redundant descriptions being omitted.

Figure 6:
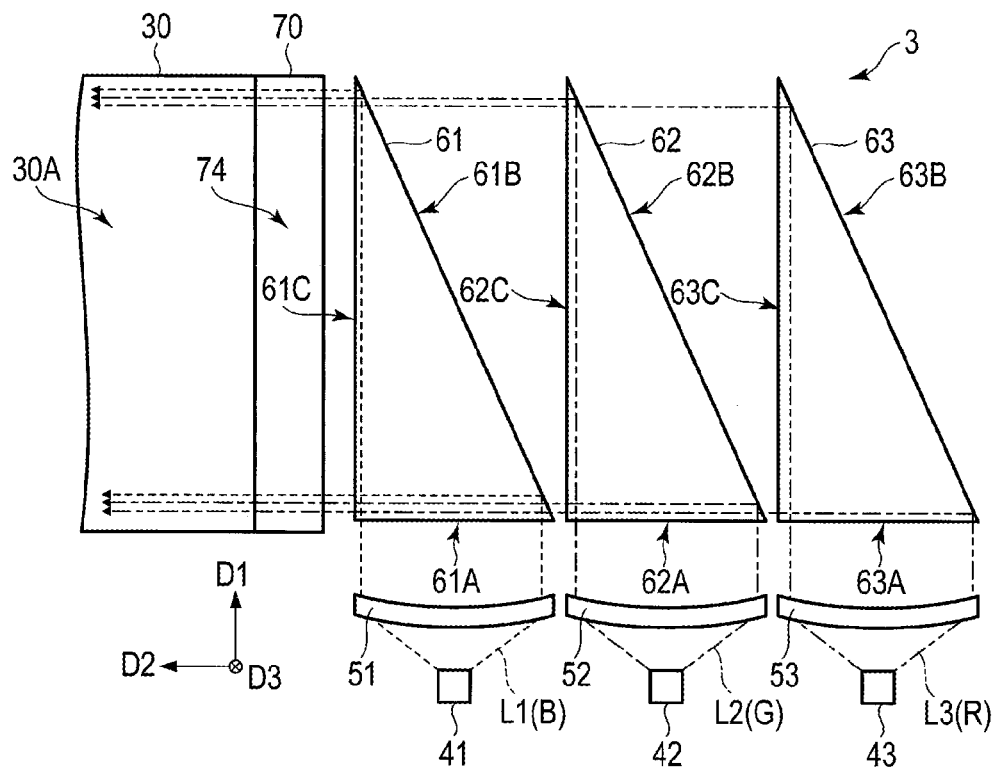
FIG. 6 is a plan view schematically showing a part of a backlight according to a second embodiment.

FIG. 6 is a plan view schematically showing a part of the backlight 3 according to the second embodiment. FIG. 7 is a side view of lenses 51 to 53, bending members 61 to 63, a refractive member 70 and a lightguide member 30. These elements are also shown in FIG. 6.

As shown in FIG. 6 and FIG. 7, in the present embodiment, the first to third bending members 61 to 63 are arranged in a second direction D2. First to third light sources 41 to 43, and the first to third lenses 51 to 53 are also arranged in the second direction D2. The positional relationships of the first light source 41, the first lens 51 and the first bending member 61, the positional relationships of the second light source 42, the second lens 52 and the second bending member 62, and the positional relationships of the third light source 43, the third lens 53 and the third bending member 63 are the same as those of the first embodiment.

The refractive member 70 comprises a surface 74 in place of the first to third surfaces 71 to 73 shown in FIG. 4 and FIG. 5. The surface 74 is, for example, a flat surface inclined at acute angle with respect to a reflective surface 30B (or an exit surface 30A) provided in the lightguide plate 30. The surface 74 may be curved.

First light L1 emitted from the first light source 41 passes through the first lens 51 and the first bending member 61, and bends such that it goes in the second direction D2. In a similar manner, second light L2 and third light L3 emitted from the second light source 42 and the third light source 43 bend in the second bending member 62 and the third bending member 63, respectively, such that they go in the second direction D2. The first light L1 which exits through a first exit portion 61C is emitted to the surface 74 of the refractive member 70. The second light L2 and the third light L3 which exit through a second exit portion 62C and a third exit portion 63C, respectively, are also emitted to the surface 74. However, the second light L2 passes through the first bending member 61 before reaching the surface 74. The third light L3 passes through the second bending member 62 and the first bending member 61 before reaching the surface 74.

The first to third light L1 to L3 emitted to the refractive member 70 are refracted on the surface 74 to the reflective surface 30B of the lightguide member 30, and are emitted to the entire reflective surface 30B. The first to third light L1 to L3 emitted to the reflective surface 30B are reflected by a prism 31 such that they go in a third direction D3. Subsequently, the first to third light L1 to L3 are emitted from the exit surface 30A to the display panel 2. The color of light emitted from the exit surface 30A is a mixture of colors of the first to third light L1 to L3 in a manner similar to that of the first embodiment.

In the present embodiment, the second light L2 caused to bend in the second bending member 62 passes through the first bending member 61. The third light L3 caused to bend in the third bending member 63 passes through the second bending member 62 and the first bending member 61. To irradiate the refractive member 70 with the second and third light L2 and L3 while maintaining the second direction D2 as the travel direction, the second or third light L2 or L3 must not bend in the first or second bending member 61 or 62. To achieve this structure, measures should be taken.

FIG. 8 is shown for explaining an example of the above measures. FIG. 8 is an enlarged view of a part of the first to third bending members 61 to 63. In the example of FIG. 8, each of first to third reflective portions 61B to 63B provided in the first to third bending members 61 to 63 comprises a plurality of inclined surfaces 64 and a plurality of flat surfaces 65. In the example of FIG. 8, the inclined surfaces 64 and the flat surfaces 65 are alternately provided.

Each inclined surface 64 is a flat surface inclined with respect to a first direction D1 and the second direction 92. Each flat surface 65 is a flat surface parallel to the first direction D1 and perpendicularly intersecting with the second direction D2. The inclined surfaces 64 and the flat surfaces 65 are parallel to the third direction D3.

The inclined surfaces 64 of the first bending member 61, the inclined surfaces 64 of the second bending member 62 and the inclined surfaces 64 of the third bending member 63 are out of alignment in the first direction D1. In another aspect, when the first to third bending members 61 to 63 are viewed in the second direction D2, the inclined surfaces 64 of the second bending member 62 overlap the flat surfaces 65 of the first bending member 61, and the inclined surfaces 64 of the third bending member 63 overlap the flat surfaces 65 of the first and second bending members 61 and 62.

The inclined surfaces 64 reflect the first to third light L1 to L3 such that the travel direction is changed from the first direction D1 to the second direction D2. Since the first to third exit portions 61C to 63C are surfaces perpendicularly intersecting with the second direction D2, the first to third light L1 to L3 reflected on the inclined surfaces 64 of the first to third bending members 61 to 63 such that they go in the second direction D2 exit through the first to third exit portions 61C to 63C without bending.

The second light L2 which exited through the second exit portion 62C enters the first bending member 61 through the flat surfaces 65 of the first bending member 61. Since both the flat surfaces 65 and the first exit portion 61C are surfaces perpendicularly intersecting with the second direction D2, the second light L2 passes through the first bending member 61 without refraction.

The third light L3 which exited through the third exit portion 63C enters the second bending member 62 through the flat surfaces 65 of the second bending member 62. Since both the flat surfaces 65 and the second exit portion 62C are surfaces perpendicularly intersecting with the second direction D2, the third light L3 passes through the second bending member 62 without refraction. Further, the third light L3 which passed through the second bending member 62 enters the first bending member 61 through the flat surfaces 65 of the first bending member 61. Since both the flat surfaces 65 and the first exit portion 61C are surfaces perpendicularly intersecting with the second direction D2, the third light L3 passes through the first bending member 61 without refraction.

Thus, in the structure shown in FIG. 8, neither the second light L2 nor the third light L3 bends in the first bending member 61 or the second bending member 62. In this way, the refractive member 70 can be irradiated with the second light L2 and the third light L3 while the second light L2 and the third light L3 maintain the second direction D2 as the travel direction together with the first light L1.

In the example of FIG. 8, the first to third bending members 61 to 63 have the same shape, and are out of alignment in the first direction D1. In this case, the same components can be used for the first to third bending members 61 to 63. Thus, the number of types of components of the backlight 3 can be reduced.

The first to third bending members 61 to 63 may have different shapes. For example, the length of each inclined surface 64 and each flat surface 65 in the first direction D1 may differ among the first to third bending members 61 to 63. None of the first to third light L1 to L3 enters the third reflective portion 63B of the third bending member 63. Thus, the third bending member 63 may not comprise any flat surface 65. Both the second light L2 and the third light L3 must enter the flat surfaces 65 of the first bending member 61. However, only the third light L3 must enter the flat surfaces 65 of the second bending member 62. Thus, the flat surfaces 65 of the second bending member 62 may be shorter than the flat surfaces 65 of the first bending member 61 in the first direction D1.

In the present embodiment, in a manner similar to that of the first embodiment, with regard to the colors of the first to third light L1 to L3 emitted from the first to third light sources 41 to 43, the best combination may be employed based on the absorbency index and refractive index of light in the refractive member 70, the lightguide member 30 and the first to third bending members 61 to 63, and the output of the light sources.

For example, from the first to third light L1 to L3 which exited from the first to third bending members 61 to 63, the first light L1 directly enters the refractive member 70. However, the second light L2 passes through the first bending member 61 before entering the refractive member 70. The third light L3 passes through the second bending member 62 and the first bending member 61 before entering the refractive member 70. Thus, the third light L3 is the easiest to attenuate because of absorption. The second light L2 is the second easiest to attenuate because of absorption. When the first to third light L1 to L3 are red, green and blue, respectively, as described above, the absorbency indexes of light have the following relationship: blue light>green light>red light. In consideration of absorption in the first to third bending members 61 to 63, the first, second and third light L1, L2 and L3 are preferably blue, green and red, respectively. When the light sources have different output, the third light source 43 may have the greatest output. The second light source 42 may have the second greatest output. The first light source 41 may have the least output.

Effects similar to those of the first embodiment can be obtained from the structures of the present embodiment explained above. In the structures of the present embodiment, there is no need to overlap the first to third light sources 41 to 43, the first to third lenses 51 to 53 or the first to third bending members 61 to 63 in the third direction D3. Thus, the backlight 3 can be thin.

Apart from the above explanation, various preferred effects can be obtained from the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, each embodiment discloses that the first to third lenses 51 to 53 are provided between the first to third light sources 41 to 43 and the first to third bending members 61 to 63, respectively. The first to third bending members 61 to 63 may have the functions of the first to third lenses 51 to 53, respectively. In other words, the first to third incident portions 61A to 63A of the first to third bending members 61 to 63 may be processed into the same curved surfaces as the first to third lenses 51 to 53 such that the light entering the first to third incident portions 61A to 63A from the first to third light sources 41 to 43 is converted into light parallel to the first direction D1.

Each embodiment shows an example in which the lightguide member 30 and the refractive member 70 are separate members. However, the lightguide member 30 and the refractive member 70 may be integrally formed.

The first to third bending members 61 to 63 of the first embodiment may be integrally formed. In this case, the first to third incident portions 61A to 63A are included in the side surface of the integrated bending member in the second direction D2. The first to third reflective portions 61B to 63B are included in the side surface inclined with respect to the first and second directions D1 and D2. The first to third exit portions 61C to 63C are included in the side surface in the first direction D1.

The first embodiment discloses that the first to third light sources 41 to 43, the first to third lenses 51 to 53 and the first to third bending members 61 to 63 are stacked in the third direction D3 such that the end portions are aligned. However, the first to third light sources 41 to 43, the first to third lenses 51 to 53 and the first to third bending members 61 to 63 may be out of alignment in the first or second direction D1 or D2. In this case, the first to third light sources 41 to 43, the first to third lenses 51 to 53 and the first to third bending members 61 to 63 may be provided as shown in, for example, FIG. 9.

Figure 9:
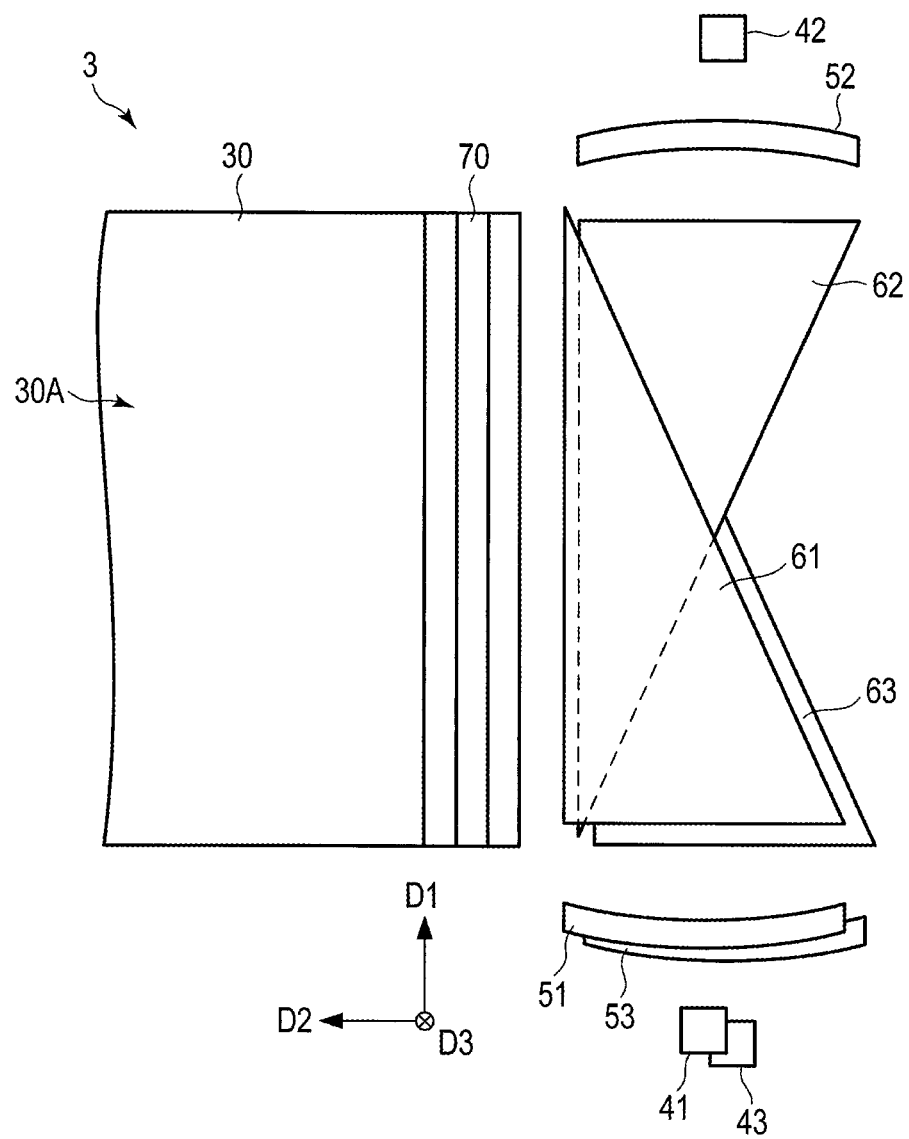
FIG. 9 shows a modification example related to the positions of a light source unit, the lens portion and the bending portion.

In the backlight 3 shown in FIG. 9, the second light source 42 overlaps neither the first light source 41 nor the third light source 43 in the third direction D3. The first to third bending members 61 to 63 are provided between the first or third light source 41 or 43 and the second light source 42. The first bending member 61 and the third bending member 63 are stacked in the third direction D3 such that the end portions are aligned. However, the second bending member 62 is provided in an orientation opposite to that of the first and third bending members 61 and 63 in the first direction D1. The first lens 51 is provided between the first light source 41 and the first incident portion 61A. The second lens 52 is provided between the second light source 42 and the second incident portion 62A. The third lens 53 is provided between the third light source 43 and the third incident portion 63A. Thus, the first lens 51 and the third lens 53 overlap each other in the third direction D3. However, the second lens 52 overlaps neither the first lens 51 nor the third lens 53. In this structure, there is no need to overlap all of the first to third light sources 41 to 43 or the first to third lenses 51 to 53 in the third direction D3. Thus, with regard to these structural elements, the thickness in the third direction D3 or the positional relationship can be more flexibly determined.

The structures of the first to third bending members 61 to 63 in each embodiment can be appropriately modified. For example, in the first embodiment, a reflective layer such as a metal film may be formed in the first to third reflective portions 61B to 63B. When a reflective layer is provided, the light which reached the first to third reflective portions 61B to 63B through the bending members 61 to 63 can be effectively reflected such that the light goes in the second direction D2. Similarly, in the second embodiment, a reflective layer may be formed on the inclined surfaces 64 of the first to third reflective portions 61B to 63B.

Figure 10:
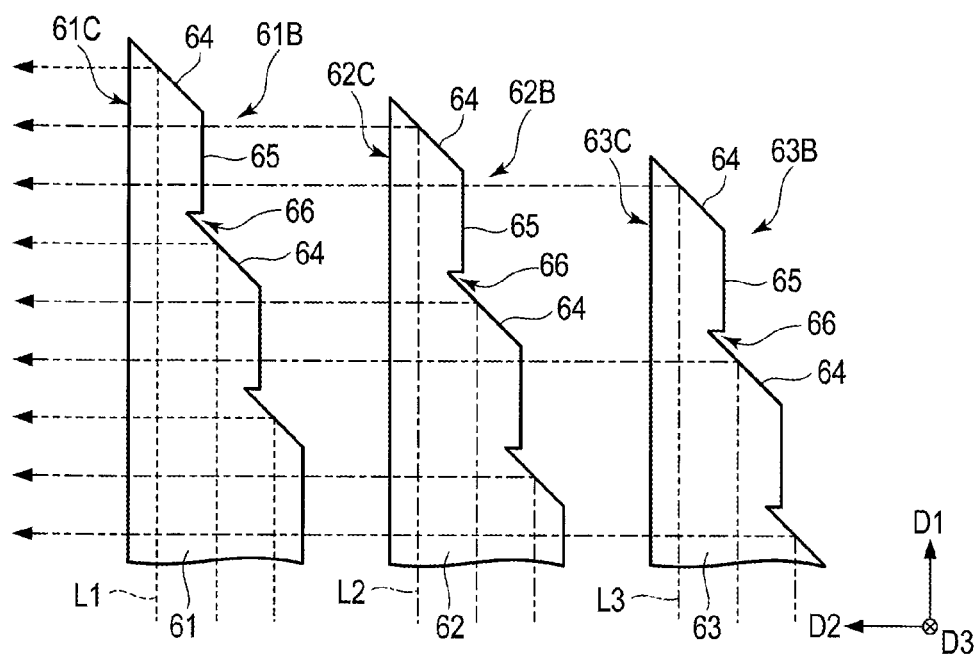
FIG. 10 shows a modification example of the shape of bending members.

The shapes of the first to third bending members 61 to 63 shown in FIG. 8 as the second embodiment can be appropriately modified. FIG. 10 shows a modification example of the first to third bending members 61 to 63. In the example of FIG. 10, a concave portion 66 is formed between each inclined surface 64 and each flat surface 65. For example, with respect to the first bending member 61, each concave portion 66 is formed by providing an end portion of a corresponding inclined surface 64 so as to be closer to the first exit portion 61C than the flat surface 65 connected to the end portion. This structure is also applied to the concave portions 66 of the second and third bending members 62 and 63. The concave portions 66 may be provided in only one or two of the first to third bending members 61 to 63.

Figure 11:
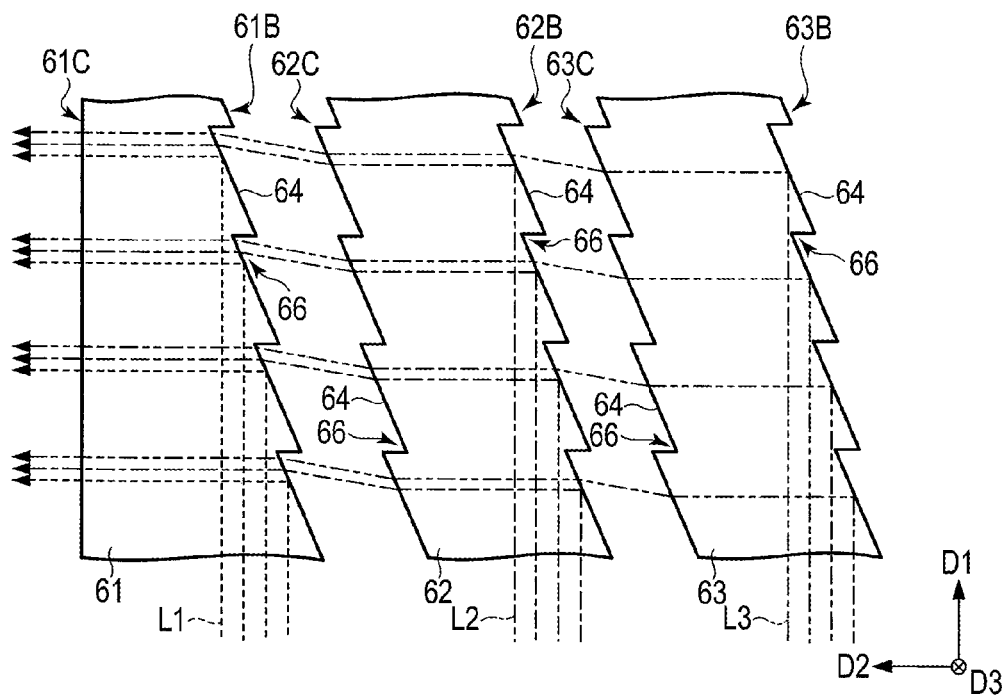
FIG. 11 shows another modification example of the shape of the bending members.

FIG. 11 shows another modification example of the first to third bending members 61 to 63. In the example of FIG. 11, the inclined surfaces 64 and the concave portions 66 are provided in the first to third reflective portions 61B to 63B of the first to third bending members 61 to 63. No flat surface 65 is provided. Further, the inclined surfaces 64 and the concave portions 66 are provided in the second exit portion 62C of the second bending member 62 and the third exit portion 63C of the third bending member 63. The first exit portion 61C of the first bending member 61 comprises neither the inclined surface 64 nor the concave portion 66.

For example, with regard to the second bending member 62, each concave portion 66 of the second reflective portion 623 is formed by providing the upper end portion of the lower one of associated two inclined surfaces 64 vertically adjacent to each other in the figure so as to be closer to the second exit portion 62C than the lower end portion of the upper inclined surface 64. This structure is also applied to the concave portions 66 of the first and third reflective portions 61B and 63B of the first and third bending members 61 and 63. Each concave portion 66 of the second exit portion 620 is formed by providing the lower end portion of the upper one of associated two inclined surfaces 64 vertically adjacent to each other in the figure so as to be closer to the second reflective portion 62B than the upper end portion of the lower inclined surface 64. This structure is also applied to the concave portions 66 of the third exit portion 630 of the third bending member 63.

The refractive index of space between the first bending member 61 and the second bending member 62 and between the second bending member 62 and the third bending member 63 is n1. The refractive index of each of the first to third bending members 61 to 63 is n2. In this case, n2 is greater than n1. The inclined surfaces 64 of the first reflective portion 61B are parallel to the inclined surfaces 64 of the second exit portion 62C. The inclined surfaces 64 of the second reflective portion 62B are parallel to the inclined surfaces 64 of the third exit portion 63C.

The inclined surfaces 64 of the first to third reflective portions 61B to 63B reflect the first to third light L1 to L3 such that the travel direction is changed from the first direction D1 to the second direction D2. The first light L1 reflected on the first reflective portion 61B exits through the first exit portion 61C without bending. The second light L2 reflected on the second reflective portion 62B is refracted on the inclined surfaces 64 of the second exit portion 620. However, the second light L2 is also refracted on the inclined surfaces 64 of the first reflective portion 61B such that the light is parallel to the second direction D2. The third light L3 reflected on the third reflective portion 63B is refracted on the inclined surfaces 64 of the third exit portion 63C. However, the third light L3 is also refracted on the inclined surfaces 64 of the second reflective portion 62B such that the light is parallel to the second direction D2. Subsequently, the third light L3 is refracted on the inclined surfaces 64 of the second exit portion 62C. However, the third light L3 is also refracted on the inclined surfaces 64 of the first reflective portion 61B such that the light is parallel to the second direction D2. The second and third light L2 and L3 refracted on the first reflective portion 61B exit through the first exit portion 61C without bending.

Even in the structure of FIG. 11, the refractive member 70 can be irradiated with the first to third light L1 to L3 while the second direction D2 is maintained as the travel direction. As is clear from the examples of FIG. 8, FIG. 10 and FIG. 11, when parallel portions are provided in the exit portion of one of the bending members, and the reflective portion of the adjacent bending member, the light which passes through the parallel portions can be parallel to the second direction D2.

Each embodiment discloses the structure for mixing the light emitted from three light sources 41 to 43. However, the number of light sources may be two, four or more. As a matter of course, the number of lenses or bending members may be decreased or increased based on the number of light sources.

Each embodiment discloses an example in which the first to third light sources 41 to 43 are provided so as to emit light in the first direction D1 parallel to the exit surface 30A of the lightguide member 30. However, the first to third light sources 41 to 43 may be provided so as to emit light in a direction intersecting with the exit surface 30A, for example, in the third direction, which is the normal direction of the exit surface 30A.

FIG. 12 shows an example of the backlight 3 in which the light sources are provided so as to emit light in the third direction D3. In the backlight 3, the first to third light sources 41 to 43, the first to third lenses 51 to 53 and the first to third bending members 61 to 63 are arranged in the second direction D2 in a manner similar to that of the second embodiment. However, in this example, the first to third incident portions 61A to 63A are flat surfaces parallel to the first and second directions D1 and D2. The first to third reflective portions 61B to 63B are flat surfaces parallel to the first direction D1 and intersecting with the second and third directions D2 and D3. The first to third exit portions 61C to 63C are flat surfaces parallel to the first and third directions D1 and D3.

For example, the first to third bending members 61 to 63 extend along the refractive member 70 so as to be long in the first direction D1. A plurality of first light sources 41 and a plurality of first lenses 51 may be provided in the first direction D1. Similarly, a plurality of second light sources 42 and a plurality of second lenses 52 may be provided in the first direction D1. A plurality of third light sources 43 and a plurality of third lenses 53 may be provided in the first direction D1.

The first to third light L1 to L3 emitted from the first to third light sources 41 to 43 bend in the first to third bending members 61 to 63 such that they go in the second direction D2. The first to third light L1 to L3 are refracted at the refractive member 70, and are emitted to the reflective surface 30B of the lightguide member 30. In a manner similar to that of the first and second embodiments, a mixture of the first to third light L1 to L3 can be obtained from the exit surface 30A of the lightguide member 30.

Each embodiment discloses an example in which each prism 31 of the light guide member 30 is irradiated with all of the first to third light L1 to L3. However, different prisms 31 may be irradiated with different light L1 to L3. Even in this case, it is possible to mix the first to third light L1 to L3 when, for example, the scattering layer DL is included.

What is claimed is:

1. A light-emitting device comprising:
   a light source unit which emits polarized light in a first direction;
   a bending portion which is irradiated with the polarized light in the first direction, and bends the polarized light such that the polarized light goes in a second direction intersecting with the first direction; and
   a lightguide member which is irradiated with the polarized light caused to bend in the bending portion, wherein
   the lightguide member comprises an exit surface, bends the polarized light such that the polarized light goes in a third direction, and emits the polarized light through the exit surface,
   the light source unit includes a first light source which emits first light in a first color, and a second light source which emits second light in a second color, and
   the bending portion includes a first incident portion which the first light enters, and a second incident portion which the second light enters.

2. The light-emitting device of claim 1, wherein
   the light source unit includes a first lens provided between the first light source and the first incident portion, and a second lens provided between the second light source and the second incident portion,
   the first light source and the second light source are point light sources which emit diverging light,
   the first lens converts the first light emitted from the first light source into light parallel to the first direction, and irradiates the first incident portion with the light, and
   the second lens converts the second light emitted from the second light source into light parallel to the first direction, and irradiates the second incident portion with the light.

3. The light-emitting device of claim 1, wherein
   the bending portion includes a first bending member comprising the first incident portion, and a second bending member comprising the second incident portion, and
   the first bending member and the second bending member are arranged in the second direction.

4. The light-emitting device of claim 3, wherein
   the first bending member is provided between the lightguide member and the second bending member,
   the first bending member comprises a surface inclined with respect to the first and second directions, and a flat surface perpendicularly intersecting with the second direction,
   the inclined surface bends the first light which enters the first bending member from the first light source such that the first light goes in the second direction, and
   the second light caused to bend in the second bending member so as to go in the second direction passes through the flat surface.

5. The light-emitting device of claim 1, wherein
   the bending portion includes a first bending member comprising the first incident portion, and a second bending member comprising the second incident portion, and
   the first bending member and the second bending member are arranged in the third direction.

6. The light-emitting device of claim 1, further comprising a refractive member which is provided between the bending portion and the lightguide member, and refracts the first light and the second light emitted from the bending portion, wherein
   the lightguide member comprises a reflective surface which reflects the first light and the second light refracted by the refractive member to the exit surface.

7. The light-emitting device of claim 6, wherein
   the refractive member comprises a first surface which the first light enters, and a second surface which the second light enters,
   the first surface is inclined at a first angle with respect to the reflective surface, and the second surface is inclined at a second angle with respect to the reflective surface, and
   the first angle is different from the second angle.

8. The light-emitting device of claim 1, wherein
   the light source unit further includes a third light source which emits third light in a third color, and
   the bending portion further includes a third incident portion which the third light enters.

9. The light-emitting device of claim 8, wherein
   the light source unit includes a first lens provided between the first light source and the first incident portion, a second lens provided between the second light source and the second incident portion, and a third lens provided between the third light source and the third incident portion,
   the first light source, the second light source and the third light source are point light sources which emit diverging light,
   the first lens converts the first light emitted from the first light source into light parallel to the first direction, and irradiates the first incident portion with the light,
   the second lens converts the second light emitted from the second light source into light parallel to the first direction, and irradiates the second incident portion with the light, and
   the third lens converts the third light emitted from the third light source into light parallel to the first direction, and irradiates the third incident portion with the light.

10. The light-emitting device of claim 8, further comprising a refractive member which is provided between the bending portion and the lightguide member, and refracts the first light, the second light and the third light emitted from the bending portion, wherein
    the lightguide member comprises a reflective surface which reflects, to the exit surface, the first light, the second light and the third light refracted by the refractive member,
    the refractive member comprises a first surface which the first light enters, a second surface which the second light enters, and a third surface which the third light enters,
    the first surface is inclined at a first angle with respect to the reflective surface, and the second surface is inclined at a second angle with respect to the reflective surface, and the third surface is inclined at a third angle with respect to the reflective surface, and the first angle, the second angle and the third angle are different from each other.

11. A display device comprising:
a first substrate;
a second substrate;
a liquid crystal layer provided between the first substrate and the second substrate;
a light source unit which emits polarized light in a first direction;
a bending portion which is irradiated with the polarized light in the first direction, and bends the polarized light such that the polarized light goes in a second direction intersecting with the first direction; and
a lightguide member which is irradiated with the polarized light caused to bend in the bending portion, wherein
the lightguide member comprises an exit surface facing the first substrate, bends the polarized light such that the polarized light goes in a third direction, and emits the light through the exit surface,
the light source unit includes a first light source which emits first light in a first color, and a second light source which emits second light in a second color, and
the bending portion includes a first incident portion which the first light enters, and a second incident portion which the second light enters.

12. The display device of claim 11, wherein
the light source unit includes a first lens provided between the first light source and the first incident portion, and a second lens provided between the second light source and the second incident portion,
the first light source and the second light source are point light sources which emit diverging light,
the first lens converts the first light emitted from the first light source into light parallel to the first direction, and irradiates the first incident portion with the light, and
the second lens converts the second light emitted from the second light source into light parallel to the first direction, and irradiates the second incident portion with the light.

13. The display device of claim 11, wherein
the bending portion includes a first bending member comprising the first incident portion, and a second bending member comprising the second incident portion, and
the first bending member and the second bending member are arranged in the second direction.

14. The display device of claim 13, wherein
the first bending member is provided between the lightguide member and the second bending member,
the first bending member comprises a surface inclined with respect to the first and second directions, and a flat surface perpendicularly intersecting with the second direction,
the inclined surface bends the first light which enters the first bending member from the first light source such that the first light goes in the second direction, and
the second light caused to bend in the second bending member so as to go in the second direction passes through the flat surface.

15. The display device of claim 11, wherein
the bending portion includes a first bending member comprising the first incident portion, and a second bending member comprising the second incident portion, and
the first bending member and the second bending member are arranged in the third direction.

16. The display device of claim 11, further comprising a refractive member which is provided between the bending portion and the lightguide member, and refracts the first light and the second light emitted from the bending portion, and
the lightguide member comprises a reflective surface which reflects, to the exit surface, the first light and the second light refracted by the refractive member.

17. The display device of claim 16, wherein
the refractive member comprises a first surface which the first light enters, and a second surface which the second light enters,
the first surface is inclined at a first angle with respect to the reflective surface, and the second surface is inclined at a second angle with respect to the reflective surface, and
the first angle is different from the second angle.

18. The display device of claim 11, wherein
the light source unit further includes a third light source which emits third light in a third color, and
the bending portion further includes a third incident portion which the third light enters.

19. The display device of claim 18, wherein
the light source unit includes a first lens provided between the first light source and the first incident portion, a second lens provided between the second light source and the second incident portion, and a third lens provided between the third light source and the third incident portion,
the first light source, the second light source and the third light source are point light sources which emit diverging light,
the first lens converts the first light emitted from the first light source into light parallel to the first direction, and irradiates the first incident portion with the light,
the second lens converts the second light emitted from the second light source into light parallel to the first direction, and irradiates the second incident portion with the light, and
the third lens converts the third light emitted from the third light source into light parallel to the first direction, and irradiates the third incident portion with the light.

20. The display device of claim 18, further comprising a refractive member which is provided between the bending portion and the lightguide member, and refracts the first light, the second light and the third light emitted from the bending portion, wherein
the lightguide member comprises a reflective surface which reflects, to the exit surface, the first light, the second light and the third light refracted by the refractive member,
the refractive member comprises a first surface which the first light enters, a second surface which the second light enters, and a third surface which the third light enters,
the first surface is inclined at a first angle with respect to the reflective surface, and the second surface is inclined at a second angle with respect to the reflective surface, and the third surface is inclined at a third angle with respect to the reflective surface, and
the first angle, the second angle and the third angle are different from each other.

* * * * *